Figure 1:
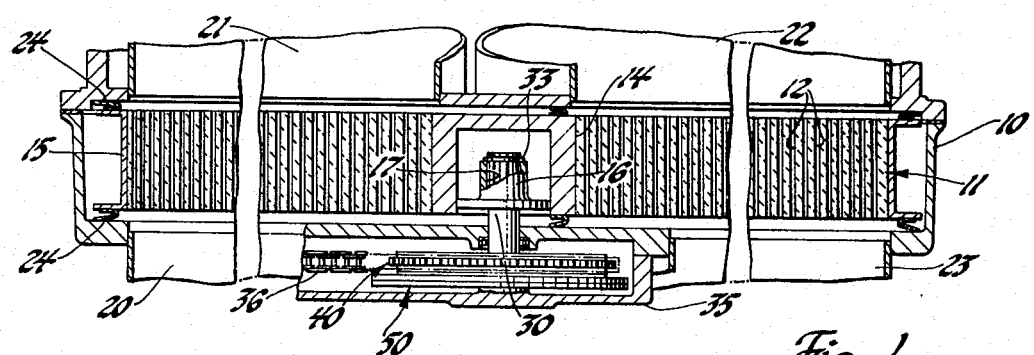

United States Patent [19]
Davis

[11] 3,913,662
[45] Oct. 21, 1975

[54] REGENERATOR DRIVE ASSEMBLY
[75] Inventor: Leonard C. Davis, Indianapolis, Ind.
[73] Assignee: General Motors Corporation, Detroit, Mich.
[22] Filed: July 5, 1974
[21] Appl. No.: 485,912

[52] U.S. Cl............... 165/8; 74/243 R; 74/443; 64/27 S; 267/156
[51] Int. Cl............................................ F28d 19/00
[58] Field of Search ...... 165/8; 74/243 R, 440, 443; 64/27 S; 267/154–157

[56] References Cited
UNITED STATES PATENTS
3,304,924  2/1967  Dolza.............................. 64/27 S X
3,476,173  11/1969  Bracken, Jr. et al. ............. 165/8 X FOREIGN PATENTS OR APPLICATIONS
515,488  11/1920  France ............................ 74/243 R
1,953,196  4/1970  Germany ......................... 64/27 S Primary Examiner—Albert W. Davis, Jr.
Attorney, Agent, or Firm—Arthur N. Krein

[57] ABSTRACT

A regenerator drive assembly for driving the matrix of a rotary regenerator heat exchange apparatus, the drive assembly including a chain driven sprocket assembly that is coupled to a matrix drive shaft by a torsion spring fixed at one end to the sprocket assembly and at its other end to the drive shaft, the sprocket assembly being further connected in driving engagement with a viscous damper assembly having a damper disk in splined driving engagement with the matrix drive shaft, this regenerator drive assembly being operational to damp out torsional oscillation between the driving and driven elements of the rotary regenerator.

4 Claims, 3 Drawing Figures

U.S. Patent  Oct. 21, 1975  3,913,662

REGENERATOR DRIVE ASSEMBLY

This invention relates to a drive assembly for a rotary regenerator heat exchange apparatus or similar apparatus and, in particular, to a drive assembly for the regenerator matrix of such an apparatus.

Rotary regenerators, particularly those of the axial flow type, utilize a porous metal or ceramic disk matrix which is rotated so that each element thereof passes successively through two aeriform fluid flow paths, absorbing heat from a hotter fluid and releasing it to cooler fluid in these flow paths.

One application of such regenerators is in preheating the combustion air in gas turbine engines. In such an application, there is a large pressure difference between the compressed air which is heated and the turbine exhaust gases which give up heat. In order to prevent leakage of the high pressure fluid into the low pressure fluid path and, also, to prevent each fluid from bypassing the matrix, seals are provided which extend around the perimeter of one or both flow paths on each face of the regenerator, bridging the gap between the regenerator disk matrix and a face of the enclosing member or housing which is proximate to the matrix.

Because of the high temperatures at which such a regenerator must operate when employed with gas turbines, the provision of an adequate durable matrix structure and of a seal structure cooperating therewith has presented difficult problems. It has now been discovered that these problems are further aggrevated by torsional oscillation or vibration of the regenerator disk.

For example, torsional vibration of the regenerator disk occurs because it is excited by the negative sloped friction characteristic of the regenerator seal material. This vibration takes place at the natural torsional frequency of the regenerator disk and its drive train. Torque oscillation in such prior art devices can be so great as to result in broken drive train parts. In such a device, the regenerator disk is the mass and the drive train is the spring of a typical spring-mass system. In the case of a chain and sprocketed drive shaft train, the springs of the system are the drive shafts and chain, the chain predominating.

It should be realized that a typical regenerator of the type used with a gas turbine engine may have a regenerator matrix disk that is about two feet in overall diameter and about three inches thick in an axial direction.

It is therefore the primary object of this invention to provide an improved drive assembly for a rotary regenerator heat exchange apparatus, or similar device, whereby torsional oscillations between the drive assembly and the element driven thereby are damped out.

Another object of this invention is to provide an improved regenerator drive assembly that includes a sprocket drive assembly connected to a matrix drive shaft by a torsion spring, the sprocket assembly being further drivingly connected to the matrix drive shaft by a damper assembly to damp out torsional oscillations between the matrix and this drive assembly.

These and other objects of the invention are obtained by a regenerator drive assembly including a drive shaft splined at one end to the matrix disk of a regenerator, the drive shaft being connected at its opposite end to a chain driven sprocket member by means of a torsion spring connected at one end to the sprocket member and fixed at its other end to the drive shaft, a viscous damper being connected to the sprocket assembly for rotation therewith with a damper disk of this viscous damper being splined to the drive shaft, the damper disk being rotatively mounted in a viscous fluid filled cavity formed for this purpose in the housing of the damper.

Figure 2:
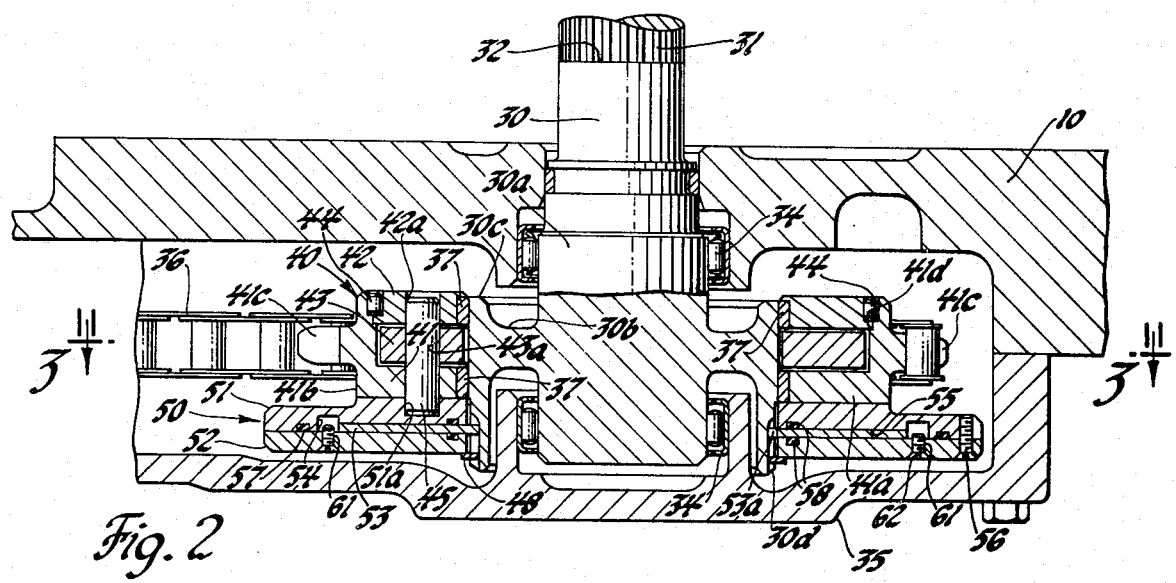
Figure 3:
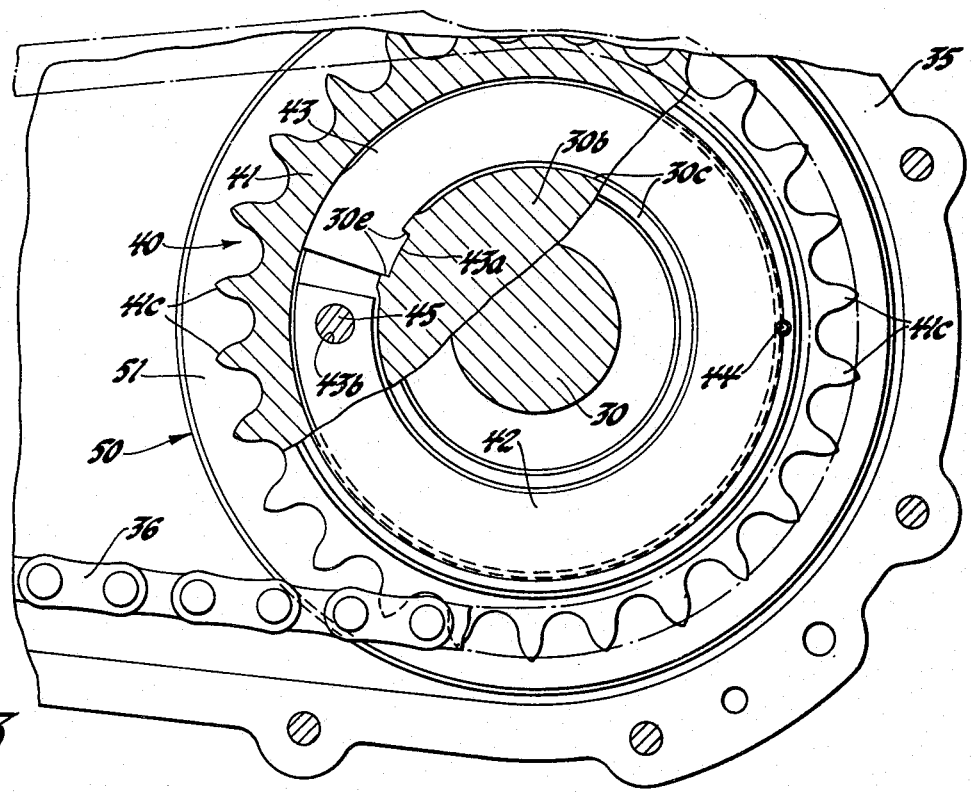

For a better understanding of the invention, as well as other objects and further features thereof, reference is had to the following detailed description of the invention to be read in connection with the accompanying drawings, wherein:

FIG. 1 is a schematic view of a rotary regenerator heat exchange apparatus taken in a plane containing the axis of rotation of the matrix thereof for the purpose of illustrating the general structure of such a rotary regenerator heat exchange apparatus and the drive arrangement therefor;

FIG. 2 is an enlarged sectional detailed view of the regenerator drive assembly of FIG. 1 in accordance with the invention taken in a plane containing the axis of rotation of the drive shaft of this device; and, FIG. 3 is a sectional view taken along line 3–3 of FIG. 2 illustrating the mounting arrangement of the torsion spring relative to the drive shaft and to the drive sprocket of the regenerator drive assembly of FIG. 2.

Referring first to FIG. 1, there is shown a rotary regenerator heat exchange apparatus of the type used with a gas turbine engine, the apparatus including a housing 10, generally drum-shaped, to enclose an annular, foraminous disk or matrix 11 which is of such construction so as to define a multiplicity of pores or passages 12, greatly enlarged in FIG. 1, extending from face to face of the matrix, generally parallel to the axis of this matrix. The matrix 11 preferably includes an inner rim 14 and an outer rim 15. The matrix is rotated about an axis defined by a matrix locating and driving hub 16 coupled to the matrix, as by having the hub 16 fixed to the inner rim 14 of the matrix. Hub 16 is provided with an axial extending through bore provided with internal splines 17 along a portion thereof whereby the matrix can be located and driven through the drive assembly of the invention, to be described hereinafter.

An inlet 20 for cool high pressure air enters one face of the housing 10 and, opposite to it, an outlet 21 is provided for the discharge of compressed air which is heated after having passed through the matrix. Hot low pressure exhaust gases enter the housing through an inlet 22 and leave the regenerator through an outlet 23, the two streams of fluid thus being in a counterflow relation in the embodiment of the regenerator illustrated. As shown, the hot exhaust gas passage is of a larger area than the cool area passage because of a difference in density between these fluids. Since the exhaust gases entering through inlet 20 engage first the upper face of the matrix, with reference to FIG. 1, this is the hot side, while the lower face of the matrix is then referred to as the cold side of the regenerator.

A sealing means or sealing assembly 24 is provided between each face of the matrix 11 and the housing 10 to confine the cold and hot fluids to the desired flow paths through the matrix from inlet to outlet and minimize leakage between the paths.

Referring now to the subject matter of the invention, the drive assembly of the invention, as shown in FIG. 2, includes a drive shaft 30 provided at one end with external splines 31 on a reduced diameter portion thereof and positioned in driving engagement with the splines 17 of hub 16, the hub 16 being fixed axially with respect to the drive shaft by engagement of the hub at one end against a shoulder 32 adjacent to the splined end of the shaft and at its opposite end by a retaining ring 33 positioned in a suitable annular groove provided for this purpose in shaft 30. At its opposite end, the shaft 30 is rotatively supported by means of a pair of bearings 34, one of which is positioned in the bored boss of housing 10 and the other is positioned in the bored boss of a chain guard and cover plate 35 suitably secured to the housing 10. The lower portion of the housing 10, with reference to FIG. 2, and the cover plate 35 are formed so as to provide an enclosed chamber for a chain 36 and sprocket drive assembly 40, the latter to be described in detail hereinafter.

The bearings 34 are mounted at opposite ends of an enlarged portion 30a at the opposite or lower end of the shaft 30, with reference to FIG. 2, and the shaft intermediate these bearings is provided with a radially extending flange 30b, shown formed integral therewith, which terminates in an axially extending annular flange 30c. This flange 30c is provided at one end, the lower end with respect to FIG. 2, with external splines 30d. The opposite end of the flange 30c, the upper end as seen in FIG. 2, is provided with spaced apart, annular peripheral bearing surfaces to receive annular bushings 37 with a generally annular surface therebetween extending substantially about the periphery of this intermediate portion but terminating in spaced apart radially extending shoulders 30e as seen in FIG. 3, to provide a spring lock seat for a purpose to be described hereinafter.

The sprocket drive assembly, generally designated 40, is journalled by the bushings 37 on the flange 30c of drive shaft 30 whereby this sprocket assembly is relatively rotatable with respect to the shaft 30. Sprocket assembly 40 includes a sprocket 41, a sprocket support 42 and a torsion spring 43. Sprocket 41 includes a bored, radial flange hub disk 41a integral with an axial extending annular flange 41b carrying the annular row of spaced apart sprocket teeth 41c adapted to be in driven engagement with sprocket chain 36 which in turn is driven through a drive sprocket, now shown, by a suitable power source, such as through a reduction gear unit operatively connected to the gas turbine engine with which the regenerator is used.

Sprocket 41, of dish-like configuration, is provided with the stepped bore therethrough to receive at one end, the radial flange 41a end, one of the bushings 37 and to provide at its other end a shoulder portion 41d against which the sprocket support 42 abuts to hold it in spaced relation from the radial flange 41a to provide an annular cavity therebetween in which the torsion spring 43 is positioned, the central aperture in support 42 receiving the other bushing 37 whereby this assembly of sprocket 41 and support 42 are rotatably journalled with respect to the shaft 30. The sprocket support 42 and sprocket 41 are suitably fixed together, as by means of pins 44 press fitted into suitable apertures provided for this purpose adjacent to the outer periphery of sprocket support 42 and the inner periphery of the flange 41b of sprocket 41 whereby these elements form a sprocket means.

As best seen in FIG. 3, torsion spring 43 is in the form of a split ring of approximately nine-tenths of a turn with a normal inside diameter greater than the outside diameter of the flange 30c portion of shaft 30. Torsion spring 43 is provided on its inner peripheral surface adjacent one end thereof with a radial lock tang 43a received in the notch provided for this purpose by the shoulders 30e on the flange of shaft 30 whereby this end of the spring is fixed to the shaft 30. The opposite end of the spring is provided with an aperture 43b to receive a pin 45 which extends through an axial extending aperture 42a in sprocket support 42, through the aperture 43b in torsion spring 43 and then through a suitable aperture provided for this purpose in sprocket 41 to protrude outboard of the sprocket 41 for a purpose to be described. With this arrangement, one end of the spring 43 is fixed for rotation with the sprocket 41 and the opposite end of the spring is fixed for rotation with shaft 30 with the spring itself providing flexible connection between these opposite ends of the spring.

With reference to FIG. 3, the assembly orientation of the torsion spring 43 to the shaft 30 and the sprocket 41 is a right-hand orientation whereby to effect driving of the shaft 30 in a clockwise direction when viewed from the matrix engaging end of this shaft, as seen in this figure, a reversed left-hand orientation of the torsion spring being required for driving the shaft in a counterclockwise direction. This orientation is required so that the spring will be mounted to the sprocket 41 and to the shaft 30 in such a manner so that as the sprocket 41 is rotated, it will tend to spirally wind the spring about the shaft 30 to effect a drive coupling between the sprocket and the shaft in a manner whereby torsional oscillations between the sprocket and the shaft can be damped by a damper assembly to be described. The purpose of the spring 43 is to provide differential motion on which the damper can operate.

In addition, the sprocket assembly 40 is further associated with the shaft 30 by means of a damper assembly, generally designated 50, which encircles the splined 30d end of shaft flange adjacent sprocket assembly 40 and which is connected in driven engagement with the sprocket 41 by means of the pin 45 of the sprocket assembly extending into a suitable drive socket provided for this purpose in one of the elements of the damper assembly.

Damper assembly 50, as best seen in FIG. 2, is positioned to encircle the splined flanged end of shaft 30 and is fixed axially thereon by a retainer ring 48 positioned in a suitable annular groove provided for this purpose adjacent one end of the splined flanged portion of shaft 30. As shown, the damper assembly 50 includes a disk-like centrally apertured housing 51, a cover plate 52 in the form of an apertured disk and a damper disk 53. Housing 51 is provided on one side with an aperture or socket 51a therein to receive the pin 45, the other side of this housing being provided with an annular deep groove 54 therein adjacent an annular central recess 55 radially inward thereof. When this housing 51 is assembled to the cover plate 52 and fixed thereto as by circumferentially spaced apart machine screws 56, only one of which is shown, there is provided a damper housing assembly having an annular cavity therein, bound on opposite sides by the internal axially spaced apart, radial extending walls of housing 51 and cover plate 52, adapted to rotatably receive the damper disk 53 therein. Disk 53 is centrally apertured and provided with internal splines 53a positioned in driving engagement with the axial extending splines 30d of shaft 30 while the damper housing assembly of housing 51 and cover plate 52 loosely encircles the shaft 30.

To effect sealing between the housing and cover plate and between these elements and the damper disk, an annular seal 57 is positioned in a suitable groove provided for this purpose in the housing radially outward of the groove 54 whereby this seal is sandwiched in sealing engagement between the housing and the cover plate. Annular seals 58 are also positioned in suitable grooves provided for this purpose in the housing 51 and cover plate 52 for sealing engagement with opposite faces of the damper disk 53 radially inward from the internal splines therein. The cavity provided by the annular groove 54 is filled with a suitable damper fluid of the desired viscosity, such as silicone oil, through one of preferably a pair of fill ports, such as threaded fill ports 61 in cover plate, but sealingly closed by screws 62 whereby the cavity can be filled with damper fluid and air can be bled therefrom during the oil filling operation.

The thickness of damper disk 53 is such that a predetermined clearance exists on opposite sides of this disk relative to the damper housing 51 and to the cover plate 52, whereby this damper disk is not fixed for rotation with either of these elements but can have limited rotation relative thereto limited by the capacity of spring 43. However, with a suitable viscous damper fluid in the cavity flowing into these clearance spaces, there will be sufficient viscous drag or friction between the damper disk 53 and the housing 51, cover plate 52 assembly during operation whereby to damp out differential motion between the sprocket 41 and shaft 30 as allowed by spring 43. The seal rings 58 engaging opposite sides of the damper disk 53 should supply very limited drive torque, preferably none. With this arrangement, any differential motion existing between the matrix and drive shaft combination, and between the damper disk 53 and the housing 51 and cover plate 52 assembly, is damped by the viscous fluid in the clearance between the housing 51 and cover plate 52 relative to the disk 53. The clearance on opposite sides of the damper disk 53 is selected so that as the housing and cover plate assembly is rotated, through its connection with the sprocket 41, there will be viscous shearing of the thin film of oil between the damper disk and the housing-cover plate assembly to provide sufficient viscous drag on the damper disk 53 to effect a connection between these elements so that this viscous drag will damp out or limit torsional oscillation between the drive and driven elements of the regenerator assembly and to damp and eliminate disk vibration.

As previously described, relative to conventional generators, the regenerator disk in such a device is the mass and the conventional sprocket and drive shaft of the drive train thereof is the spring of a typical spring-mass system. Now, in accordance with the improved drive arrangement of the invention, as just described, there is inserted in such a rotary unit another spring in series with the others in the drive train thereof, but this spring has a lower rate. With reference to the embodiment shown, this additional spring, the spring 43, takes the drive torque between the sprocket 41 and the shaft 30 and is also flexed by any friction induced vibration. As described, the viscous damper assembly 50 is tied across this spring 43. The damper assembly 50 functions only when oscillatory conditions arise.

As shown, the spring 43 joins the sprocket 41 to the shaft 30 and differential motion takes place between these parts when torsional vibration occurs. Also, as disclosed, the housing assembly 51 and 52 of the damper assembly 50 is pinned to the sprocket 41 while the disk 53 of this assembly is splined to the shaft 30. With this arrangement, any differential motion in the sprocket 41 due to vibration causes motion between the damper disk 53 and housing assembly 51 and 52, shearing the viscous fluid between the disk 53 and the housing assembly to provide a positive damping torque. It will thus be seen that the damper assembly 50 is installed in parallel with the spring 43 to effect a connection from the sprocket 41 to the shaft 30.

With the space limitations shown in FIG. 2 for the damper assembly 50, a fluid with relatively high viscosity should be used in this assembly. However, it should be realized that if more space is available, this damper assembly could be made considerably larger in diameter or could incorporate multiple damper disks, such as disk 53 therein, to achieve adequate damping with the use of a less viscous fluid.

Although the subject drive arrangement is disclosed as being used with a rotary regenerator, it should be realized that it could be utilized in any torsional drive train where torsional vibrations are either friction induced, as in the matrix-seal friction, or result from a forcing function. Other examples of friction induced vibrations would be those resulting from tool chatter, brake squeal or clutch chatter.

What is claimed is:

1. A rotary regenerator including a housing, a drive shaft rotatably journalled in said housing, a matrix disk supported at one end of said drive shaft in driven engagement therewith, a driven sprocket means encircling said drive shaft adjacent the opposite end thereof, said sprocket means being connectable to a driven roller chain and journalled on said drive shaft for relative rotation with respect to said drive shaft, a torsion spring partly encircling said drive shaft and connected at one end to said sprocket means and at its other end to said drive shaft, and a viscous damper means operatively connected to said sprocket means and to said drive shaft whereby said spring and said viscous damper means effect a parallel connection between said sprocket means and said drive shaft.

2. A rotary regenerator according to claim 1 wherein said viscous damper means includes a damper housing loosely encircling said drive shaft and fixed to said sprocket means for rotation therewith, said damper housing providing an annular cavity therein defined in part by spaced apart, radially extending internal walls, a damper disk rotatably positioned in said cavity for rotation relative to said damper housing, said damper disk encircling said drive shaft in splined engagement therewith, annular seal means on opposite sides of said damper disk radially outboard of said shaft sandwiched between said damper disk and said internal walls, and a viscous fluid in said cavity in fluid engagement with opposite sides of said damper disk and said spaced apart internal walls.

3. A rotary regenerator including a housing, a shaft rotatably journalled in said housing, a regenerator matrix rotatably positioned in said housing in driven engagement with one end of said shaft, said shaft adjacent to its opposite end having annular peripheral spaced apart bearing surfaces with said shaft intermediate said bearing surfaces having a lock seat in the peripheral surface thereof and an external axial splined portion adjacent to one of said bearing surfaces, a driven sprocket means rotatably supported on said shaft by said bearing surfaces and defining an annular cavity encircling said shaft intermediate said bearing surfaces, a ring spring of approximately nine-tenths of a turn positioned in said cavity, said spring having at one end thereof a lock tang engaged in said lock seat on said drive shaft, the opposite end of said spring being fixed to said sprocket means for rotation therewith, a damper housing loosely encircling said splined portion of said shaft and fixed to said sprocket means for rotation therewith, said damper housing providing an annular cavity bounded by axially spaced apart internal walls encircling said splined portion of said shaft, at least one damper disk having a centrally splined aperture therethrough positioned in said cavity for rotation relative to said damper housing, said centrally splined aperture of said damper disk engaging said splined portion of said shaft, a viscous fluid in said cavity in said damper housing and, annular seal means associated with said damper disk and said damper housing in position to prevent radial inward flow of viscous fluid next radially adjacent to said splined aperture, said spring and said damper disk providing parallel connections between said sprocket means and said shaft.

4. A rotary mechanism including a housing, a drive shaft rotatably journalled in said housing, a driven means operatively connected to one end of said drive shaft in driven engagement therewith, said drive shaft adjacent to its opposite end having annular peripheral spaced apart bearing surfaces with a substantially annular peripheral surface therebetween terminating in spaced apart shoulders to provide a lock seat and an external axial splined portion adjacent to one of said bearing surfaces, a driven sprocket means rotatably supported on said drive shaft by said bearing surfaces and defining an annular cavity encircling said shaft intermediate said bearing surfaces, a split ring spring having a lock tang at one end positioned in said cavity in said sprocket means with said lock tank engaged in said lock seat on said drive shaft and with the opposite end of said spring fixed to said sprocket means, a damper housing loosely encircling said splined portion of said drive shaft and fixed to said sprocket means for rotation therewith, said damper housing providing an annular cavity encircling said splined portion of said drive shaft, said cavity in said damper housing being defined in part by axially spaced apart, radially extending internal walls of said damper housing, at least one damper disk having a centrally splined aperture therethrough rotatably positioned relative to said damper housing in said cavity in said damper housing with its splines in engagement with said splined portion of said drive shaft, annular seal means associated with said damper disk and said damper housing adjacent to and radially outward of said splined portion of said drive shaft, and a viscous fluid in said cavity for fluid engagement with opposite sides of said damper disk and said spaced apart internal walls of said damper housing.

* * * * *